United States Patent [19]
Neff

[11] Patent Number: 5,647,166
[45] Date of Patent: Jul. 15, 1997

US005647166A

[54] TRELLIS

[76] Inventor: Gregor N. Neff, 85 Myrtle Ave., Dobbs Ferry, N.Y. 10522

[21] Appl. No.: 261,431

[22] Filed: Jun. 17, 1994

[51] Int. Cl.[6] .............................................. A01G 17/06
[52] U.S. Cl. ................................................ 47/45; 256/32
[58] Field of Search ............................... 47/45 R, 46 R; 256/32, 33, 37, 46, 12.5

[56] References Cited

U.S. PATENT DOCUMENTS

| 1,251,168 | 12/1917 | Barnes | 256/33 |
|---|---|---|---|
| 3,026,650 | 3/1962 | Miller | 47/46 R |
| 3,345,040 | 10/1967 | Rivelli | 256/37 |
| 3,393,897 | 7/1968 | Wright | 256/32 |
| 4,301,618 | 11/1981 | August | 47/46 R |

FOREIGN PATENT DOCUMENTS

| 142080 | 7/1951 | Australia | 256/32 |
|---|---|---|---|
| 403595 | 5/1967 | Australia | 256/32 |
| 2372295 | 7/1978 | France | 47/46 R |
| 456777 | 4/1950 | Italy | 47/46 R |

*Primary Examiner*—Terry Lee Melius
*Assistant Examiner*—Joanne C. Downs
*Attorney, Agent, or Firm*—Curtis, Morris & Safford P.C.; Gregor N. Neff, Esq.

[57] ABSTRACT

A trellis and trellise kit are provided with poles and lattice netting in which the lattice netting can be rolled up on the poles to which they are attached. Two crossbars are provided. They can be easily slipped on and off the poles to detach them from the netting, and the trellis can be formed into a compact package for shipping, warehousing, or storage by the user in a protected location. The poles preferably have square cross-sections. A pair of crossbars is provided with square holes slightly larger than the poles, so that the crossbars fit slidably onto the poles. The crossbars have very simple hook structures which engage the upper and lower edges of the netting to stretch it tight. Advantageously, the netting is made to bend across at least one edge of the crossbars, and at least one edge of each of the poles, so as to relieve strain on the fastening structures. The netting also can be rolled up on the poles to adjust the width and/or the tension on the netting, and the bottom crossbar can be moved slidably on the poles to adjust the tension and lattice dimension in the vertical direction.

19 Claims, 5 Drawing Sheets

TRELLIS

This invention relates to trellises.

One of the problems with many trellises is that the parts are secured together firmly so that, if it is desired to remove the trellis from the ground and store it in a protected place during the winter or other time when it is not in use, it takes up a great deal of storage space.

Furthermore, the making and selling of trellises usually is hampered by the fact that fully assembled trellises are difficult and expensive to ship because of their high ratio of volume to weight. Warehousing costs can be excessive for the same reason. Furthermore, some larger trellises can be shipped only by relatively expensive freight because they exceed the size limitations for shipping by U.P.S. or similar relatively low-cost means. Also, the packaging for such trellises can be expensive. Thus, a mail-order trellis business can be greatly hampered by shipping and storage problems.

Accordingly, it is an object of the present invention to alleviate or solve the foregoing problems.

In particular, it is an object of the invention to provide a trellis structure and kit which is relatively easy to take apart and put into a compact form for either shipping or storage.

It is a further object to provide a trellis in which the tension on the lattice netting and/or the width of the trellis can be easily adjusted.

It is a further object to provide such a trellis in which the netting is held securely in the frame without excessive strain on fastening means used to fasten the netting to the frame.

It is another object of the invention to provide such a trellis in which the vertical height and/or tension of the lattice netting can be adjusted relatively easily.

It is a further object of the invention to provide such a trellis which is sturdy in construction and relatively simple and inexpensive to manufacture, and which resists deterioration due to exposure to the elements.

It is still a further object of the invention to provide such a trellis which can be joined with other sections of trellis in a modular fashion to form elongated trellis structures compactly, economically, and with considerable structural strength.

A further object of the invention is to provide such a trellis in which the lattice netting is relatively easy to replace.

In accordance with the foregoing, a trellis kit is provided which includes at least a pair of poles and at least one crossbar with a pair of holes into which the poles are adapted to slip so as to form a frame, with a lattice made of flexible netting and shaped to span the space between the poles when attached to them. By this means, the crossbar can be slipped onto the poles in forming a trellis, and can be slipped off of the poles to easily disassemble the trellis either for storage or shipping.

In a preferred embodiment, the crossbar has a structure for holding the poles in a selected one of a plurality of different rotational positions so as to permit adjustment of the tension on and/or width of the trellis when said netting is attached between said poles. Preferably, the holes and the cross-section of the poles have matching shapes so that, when a pole is removed from the crossbar hole, it can be rotated to roll up or unroll the netting on the pole so as to adjust its width, and then can be re-inserted into the hole.

Preferably, two crossbars are slipped onto the poles at opposite ends, with one forming a top crossbar and the other a bottom crossbar. A stop member is located below the top end of each pole so as to stop the top crossbar from sliding down the poles.

Fastening means are provided for both crossbars so that the netting easily can be attached to and slipped off of the crossbars for assembling and disassembling the trellis.

It also is preferable that the bottom crossbar remain free to slide vertically on the poles. Tension advantageously is applied to the netting by the weight of the bottom crossbar and/or by vertical movement of the bottom crossbar to increase or reduce the tension on the netting. Additional poles can be provided for use as braces to support the trellises in a vertical position.

Advantageously, elongated hooks are provided on the crossbars and, if desired, on the poles so that the netting can be easily hooked onto or slipped off of the poles and/or the crossbars.

A particularly simple and inexpensive means of attaching the netting to the poles is by stapling it, where the poles are made out of wood or other similar material into which drivable fasteners can be driven.

Very wide trellis panels can be made by providing intermediate poles extending through holes in the top and bottom crossbars into which the netting is releasably secured. Long trellises can be assembled in a modular fashion by fastening successive frame structures one to the other, using common poles to save on cost and materials and provide integral strength.

The poles can be made out of wide variety of materials, such as treated and natural wood, steel or aluminum tubing, channel or angles, plastic-coated metals or plastic materials, etc. Poles or crossbars can be molded or extruded, in addition to being formed out of natural materials such as wood.

The netting can be made of any of a number of different materials, such as large-mesh nylon netting; extruded plastic netting; expanded plastic netting, etc.

The foregoing and other objects and advantages of the invention will be described in or apparent from the following description and drawings.

GENERAL DESCRIPTION

Figure 1:
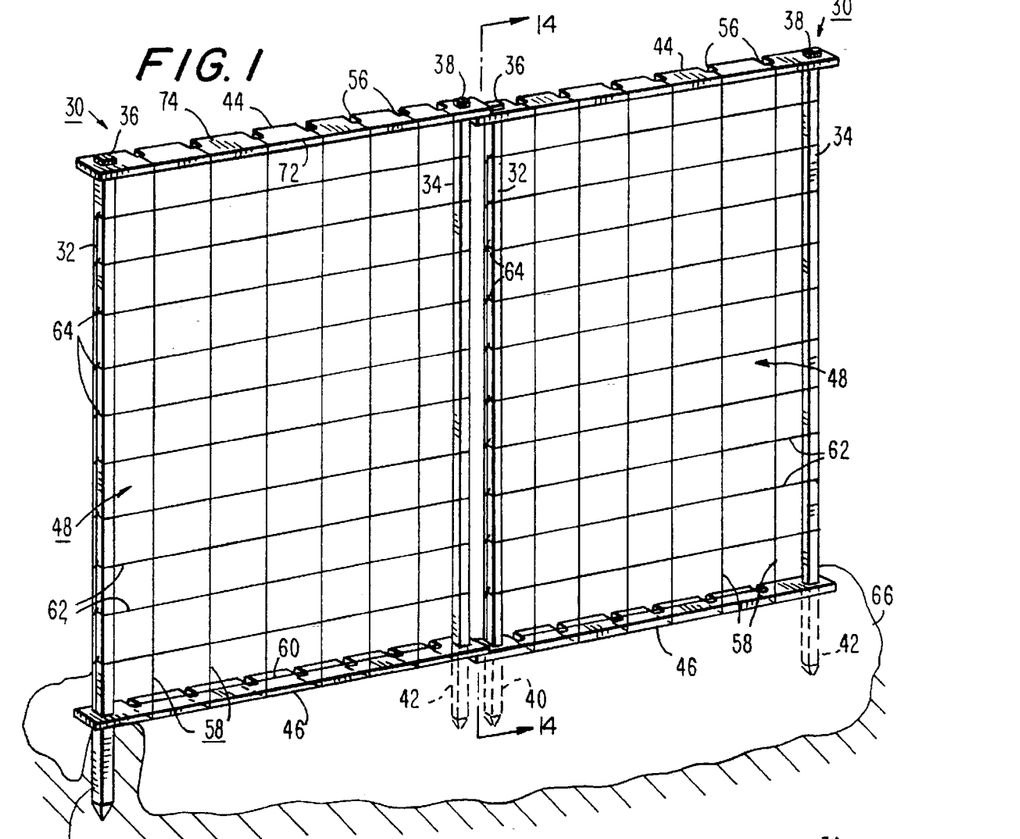
FIG. 1 is a perspective view of a pair of trellises constructed in accordance with the present invention.

FIG. 1 shows a pair of trellises 30 driven into the ground 66 and standing next to one another ready to support vining vegetables, flowers, etc. in the garden, or in a commercial growing operation.

Each trellis 30 includes two poles 32 and 34, each having an upper end 36 or 38 and a lower end 40 or 42. Each of the lower ends 40 or 42 preferably is driven into the ground to support the trellis.

Each trellis has a top crossbar 44 and a bottom crossbar 46, each of which is slidably mounted on the poles 32 and 34.

Also provided is a lattice 48 made out of flexible netting which is attached at its side edges to the poles 32 and 34, and at its top and bottom edges to the top crossbar 44 and the bottom crossbar 46, respectively.

Figure 2:
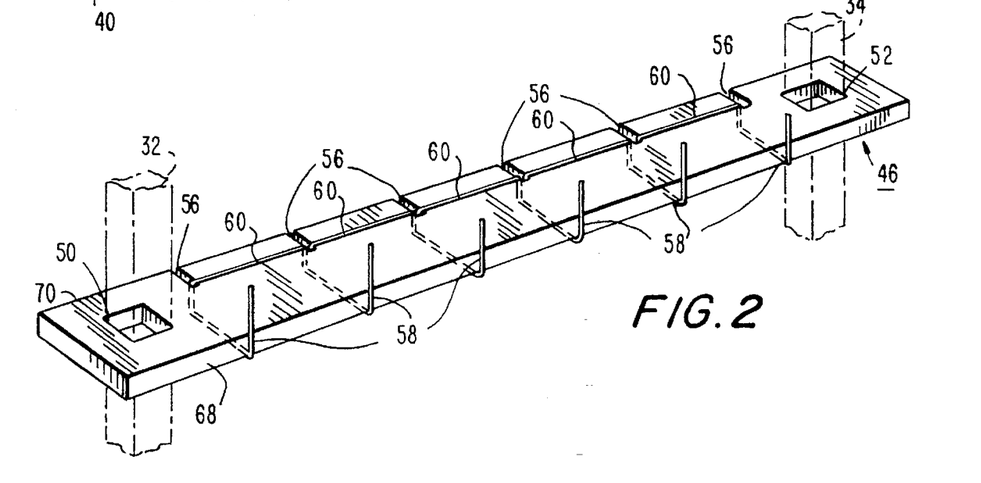
FIG. 2 is a perspective view of a portion of one of the trellises shown in FIG. 1.

FIG. 2 is a perspective view of the bottom crossbar 46. In addition, because the top crossbar 44 is identical in structure, FIG. 2 also shows the structure of the top crossbar 44.

The crossbar 46 consists of a flat board, with a front edge 68 and a rear edge 70. The board has square holes 50 and 52 cut in it adjacent opposite ends.

Referring again to FIG. 1, the lattice netting is made up of vertical strands 58 and horizontal strands 62 which are joined together at their crossing points.

Referring again to FIG. 2, the crossbar 46 has a plurality of transverse, relatively shallow slots 56 cut in the rear edge 70. The spacing of these slots is made to match exactly the spacing between adjacent vertical strands 58 of the netting.

In fastening the bottom edge of the netting to the crossbar 46, the netting is wrapped under the board, and the ends of the strands 58 are inserted in the slots 56, and the horizontal end segments 60 of the netting are hooked over the projections which are formed between the adjacent slots 56.

Similarly, the top crossbar 44 has slots 56 in its rear edge 74. The upper edge of the netting is wrapped over the front edge 72 of the crossbar 44, and the vertical strands 58 are passed through the slots and hooked over the projections in the manner shown in FIG. 2, except upside down.

Figure 3:
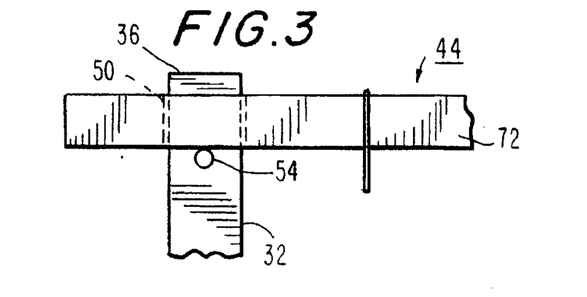
FIG. 3 is a partially broken away elevation view of a portion of one of the trellises shown in FIG. 1.

As it is shown in FIG. 3, the dimensions of the hole 50 are slightly less than the outside dimensions of the upper end of the pole 32, so that the upper crossbar slides freely on the upper ends of the poles.

A stop member 54 is provided near the upper end 36 of the pole so as to stop the upper crossbar and hold it at a position in which the upper end 36 of the pole 32 protrudes slightly above the upper surface of the crossbar 44. This provides a good surface to hit when pounding the pole to drive it into the ground.

The stop member 54 preferably is a metal pin force-fitted into a hole and extending through the pole and out the other side so that it will support the crossbar 44 on both sides of the pole. Alternatively, the stop member can be one or a pair of screws, nails, or other fasteners extending out from one or more sides of the pole.

Figure 4:
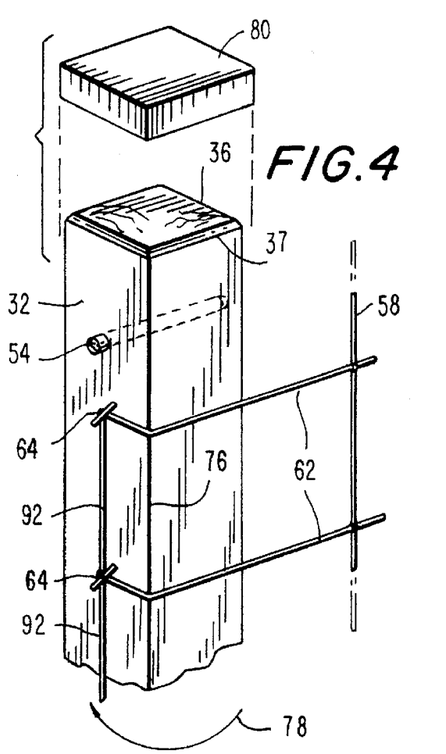
FIG. 4 is an enlarged perspective view, partially broken away, of a portion of one of the trellises shown in FIG. 1.

Referring now to FIG. 4, as well as to FIG. 1, the side edges of the lattice netting preferably are attached to the poles by means of staples 64. Each staple preferably is applied at a junction between horizontal strands 62 and the vertical edge strand 92, and the strand 92 is stretched tightly in between the staples.

Tension/Width Adjustments

In accordance with one of the more highly advantageous features of the present invention, the netting preferably is made to be wider than the distance between the poles 32 and 34 when fitted into the crossbars. Thus, in order to stretch the netting tightly between the two poles, the poles 32 and 34 should be rotated at least a quarter turn in the direction shown by the arrow 78, to the position shown in FIG. 4, where the netting strands 62 are bent through a 90° angle bearing against the edge 76 of the pole. Actually, it is even better if the pole is rotated further so that the horizontal netting strands are wrapped around the pole by one or more full turns.

By forcing the strands 62 to bend over one or more edges of the pole, such as edge 76, the netting can be stretched to a relatively high degree of tension without placing excessive stress on the fastener 64. This allows the use of smaller fasteners, and/or permits the application of greater tension to the netting without loosening the fastening structure.

Figure 9:
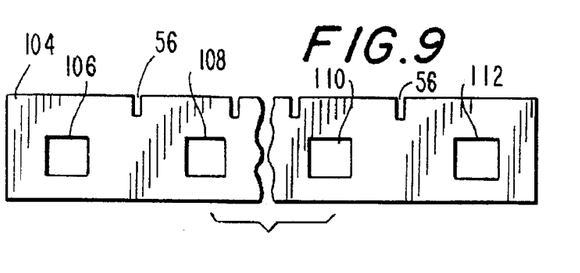
FIG. 9 is a top plan view of a portion of a further embodiment of the invention.

Advantageously, by rotating either or both of the poles 32, the width of the trellis can be varied, either for forming a variable width trellis with the use of crossbars as shown in FIG. 9, or for other reasons such as reducing the width of the netting after removing a section that has become damaged.

After the poles have been inserted into one or both of the crossbars, they do not rotate any further and they are held solidly in place.

Tension/Height Adjustments

The fastening means used with the top and bottom crossbars has similar advantages. Since the strands 58 are bent over at least one edge of the crossbar, strain on the netting is similarly relieved. Furthermore, although it is possible to use notches or slots in the front edge 68 of the crossbar 46 to form the hooks on which the strands 60 are hooked to attach the netting, it forms a much more secure attachment to wrap the netting around the board and attach it at the rear as shown in FIG. 2.

If desired, notches or slots also can be provided in the front edge of the board opposite the slots 56 to bring the ends of the strands 58 closer to the plane of the remainder of the netting. The same result can be obtained by reducing the width of the crossbar in the area between the holes 50 and 52.

Also shown in FIG. 4 is a removable end cap 80 preferably made out of steel or other metal. The end cap 80 fits over the top of the pole 36 to protect it while the pole is being pounded into the ground. This prevents the wood at the top of the pole from splaying outwardly and interfering with the removal of the crossbar from the poles. The end cap can be removed from one pole after it has been driven in, and placed on the next pole while it is being driven in, etc.

If splaying occurs, it can be easily trimmed off with a knife. However, it can be minimized by beveling the upper edges of the top of the pole, as shown at 37 in FIG. 4.

Disassembly and Packing

Figure 5:
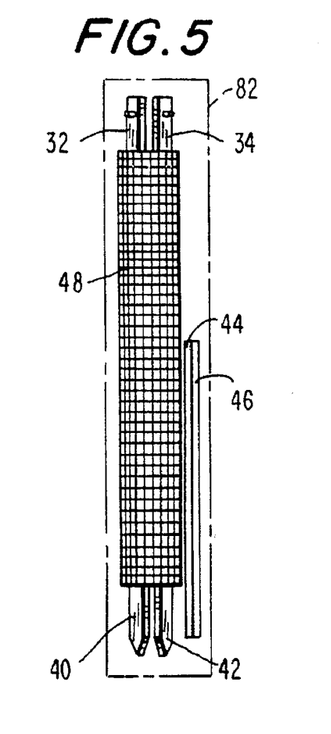
FIG. 5 is a top plan view of a kit comprising a disassembled trellis of the type shown in FIG. 1, fitted into a compact enclosure.

When it is desired to remove the trellises from the ground at the end of a growing season for storage and protection from the elements, the poles 32 and 34 can be pulled out of the ground. If desired, the trellis can be stored in its fully assembled condition. However, since this requires a great deal of space, the trellis preferably is disassembled, as follows:

The vertical netting strands 58 are removed from the slots 56 quickly and easily to detach the netting from the crossbars. Then, the crossbars 44 and 46 are simply slipped off of the ends of the poles. Finally, the netting is simply rolled up on one or both of the poles to form a compact structure, as is shown in FIG. 5. With the crossbars 44 and 46, the total structure, including the poles 32 and 34 and the rolled up netting 48, has a slim, compact outline which easily can fit into a box whose outline is indicated generally at 82.

Trellis Kit

FIG. 5 also depicts a kit as it might be shipped from a manufacturing plant in a box 82 to the customer. The box 82 can have less volume than one containing a fully assembled trellis, and requires much less packaging material. Furthermore, within limits, its dimensions will allow it to be shipped by relatively low cost carriers, such as UPS, instead of by the more expensive motor or other freight carriers. Thus, a mail-order business in supplying the trellises can be practical.

Alternative Pole Constructions

Figure 6:
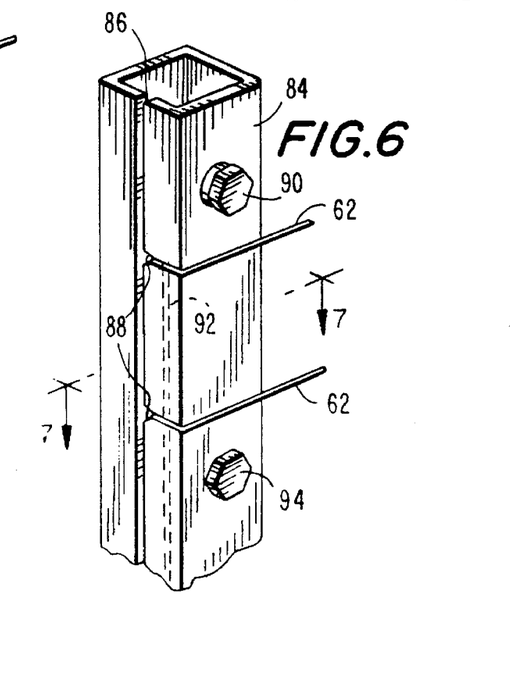
FIG. 6 is a perspective view of a portion of an alternative embodiment of one of the poles of the trellis of the present invention.
Figure 7:
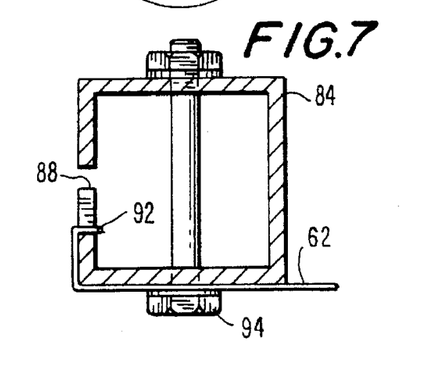
FIG. 7 is a cross-sectional view taken along line 7—7 of FIG. 6.

FIGS. 6 and 7 show an alternative pole construction where the poles are made out of metal tubing 84, either painted steel or plastic coated steel, or aluminum, for corrosion resistance.

Each pole 84 has a longitudinal slot 86 with notches 88 cut in one edge of the slot. The ends of the horizontal strands 62 are fitted into the notches, and the vertical strand 92 is wrapped in behind the hooks formed by the spaced notches to hold the side edges of the netting tightly onto the poles.

A plurality of bolts or other threaded fasteners 90 and 94 pass through the tubing as shown in FIG. 7. After the netting has been inserted into the slots, the bolts can be tightened to close the gap 86 so that it is essentially impossible for the netting to come loose from the poles. This permits one to easily change the netting when it becomes too old to be useful or it has been damaged, simply by loosening the bolts 94 to permit removal of the old netting and insertion of new netting, and then reclosing the gap 86 by tightening the bolts.

The upper-most bolt head 90 protrudes outwardly from the surface farther than the other bolt heads to serve as a stop member.

This construction is advantageous in that the metal poles 84 can be very long lasting so that they well might. This construction might be preferable for commercial operations where the relatively higher cost of the metal poles and fasteners, etc., can be justified by the savings in capital investment over a long period of time.

Figure 10:
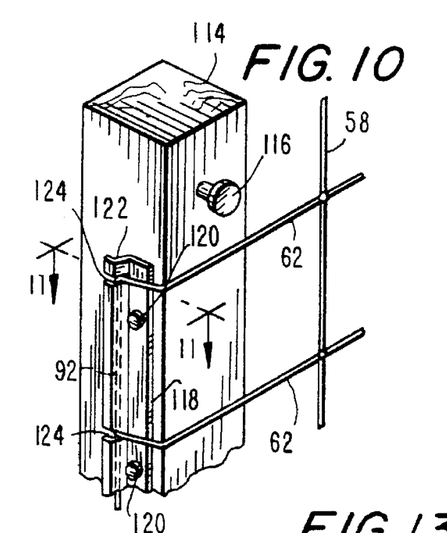
FIG. 10 is a partially broken away perspective view of another portion of an alternative embodiment of the invention.

FIG. 10 shows an alternative pole construction for use with wooden poles 114, and is especially desirable for use with long lasting wooden poles such as those which may be made out of pressure treated lumber, redwood, cedar, or similarly rot-resistant materials.

Figure 11:
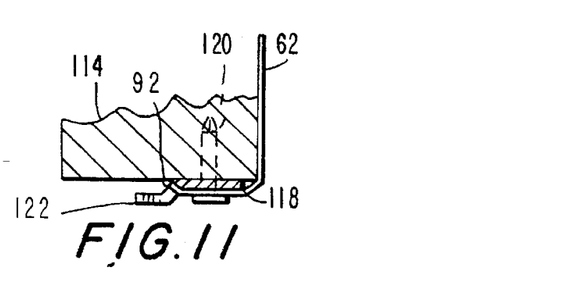
FIG. 11 is a cross-sectional view taken along line 11—11 of FIG. 10.

An elongated strip 118 is nailed by means of nails 120 along one side of the pole 114. The strip 118, preferably made out of rust-resistant metal or strong plastic, has a bent-out edge 122 (also see FIG. 11) and spaced notches 124. The horizontal strands 62 are fitted into the notches 124 and vertical strand 92 fits under the hooks thus formed to secure the netting to the poles. A screw 116 serves as a stop member.

It is preferable to make the notches 124 wedge-shaped so that the strands of material are wedged into the slots, thus making them more securely held in place.

Figure 12:
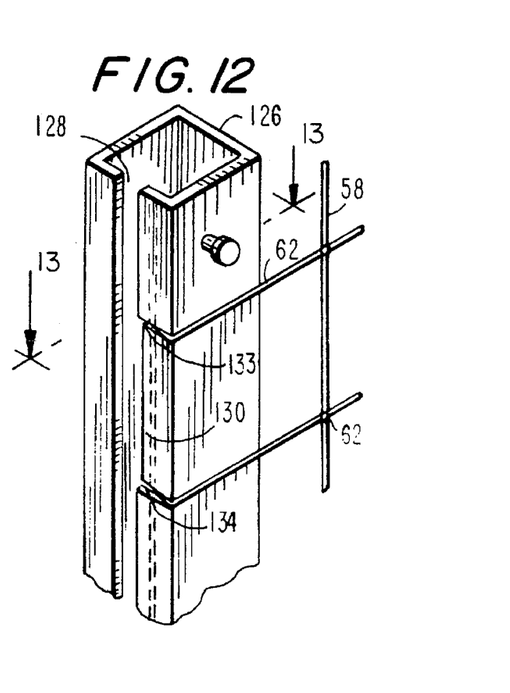
FIG. 12 is a perspective view of a portion of another embodiment of the invention.

FIG. 12 shows another embodiment of the metal poles. In the FIG. 12 embodiment, a square metal member with a C-shaped cross-section has a relatively large gap 128 along one side. One edge of the material at the gap is bent inwardly at spaced intervals to form bent panels 130 (also see FIG. 13) with a punch and die process. This process simultaneously severs the panels 130 from the remaining material at the sides of the panels and forms gaps 134 at the desired locations.

The panels 130 are located next to straight panels that have not been bent so as to stagger the panels 130. The mechanism used for holding the edges of the netting is the same as in the FIG. 10 embodiment.

Figure 8:
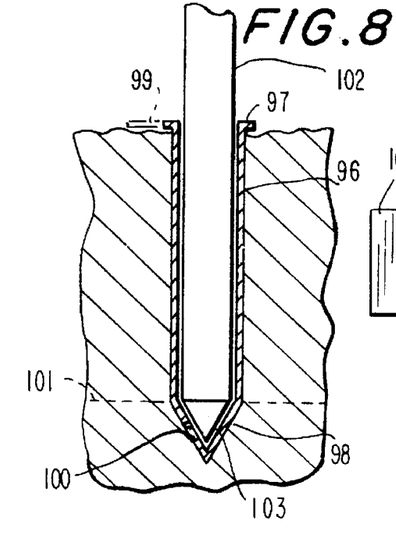
FIG. 8 is a partially cross-sectional, partially broken away side elevation view of another embodiment of the present invention.

FIG. 8 is a cross-sectional view showing special end tips which are force fitted onto the ends of wooden poles such as the pole 102. The end tips 96 are pieces of metal tubing which are pointed at the lower end 98 and have drain holes 100 to drain into the ground any liquid that might accumulate in the tubing.

The tubes 96 have relatively wide flanges 97 or 99 at the upper edge.

The metal-tipped ends can be pounded into the ground by pounding on the flanges 97, or, in one embodiment of the invention, simply by stepping downwardly on the relatively longer projection 99 to force the point into the earth. The holes 50 and 52 in the bottom crossbar 46 must be made large enough and of the right shape to pass over the flanges when slipped over the lower ends of the poles.

FIG. 8 also depicts the provision of pole-receiving sockets 96 which can be embedded in the ground and left there after the poles have been removed. In this case, the internal dimensions of the tube 96 are greater than the outside dimensions of the pole 102 so that the pole 102 can be inserted into the tube 96 and removed easily.

After the trellis poles have been removed from the sockets 96, each socket can be plugged to prevent the entry of soil and water when the poles are absent.

FIG. 8 also depicts another alternative construction. Instead of being pointed at the end, the metal member 96 is simply a straight tube, round or square, with a straight edge cut along the line 101. Preferably, the pole 102 has a pointed end as shown at 103.

In use, the straight tube 96 is slipped over the lower end of the pole after the bottom crossbar 46, thus avoiding the need for enlarging the holes 50 and 52. Then, the pole 102 is driven into the ground to the desired depth, and the tube 96 then is driven down to a desired depth. The tube thus serves as a liner which stays in the ground and can be re-used later. It, too, should be plugged when not in use.

Variable Width Trellis

FIG. 9 shows a crossbar construction which has more than two square holes formed in a flat board 104, with slots 56 in the rear edge, as in the previous embodiments. In the example shown, four square holes 106, 108, 110, 112 are provided. This allows the user to make a trellis of variable width. Due to the fact that the width of the netting can be shortened easily simply by rolling the netting up on one or both of the poles 32 and 34, changing the width is easy to do.

Prop Structure

Figures 14, 15, 16, 17, 18, 19:
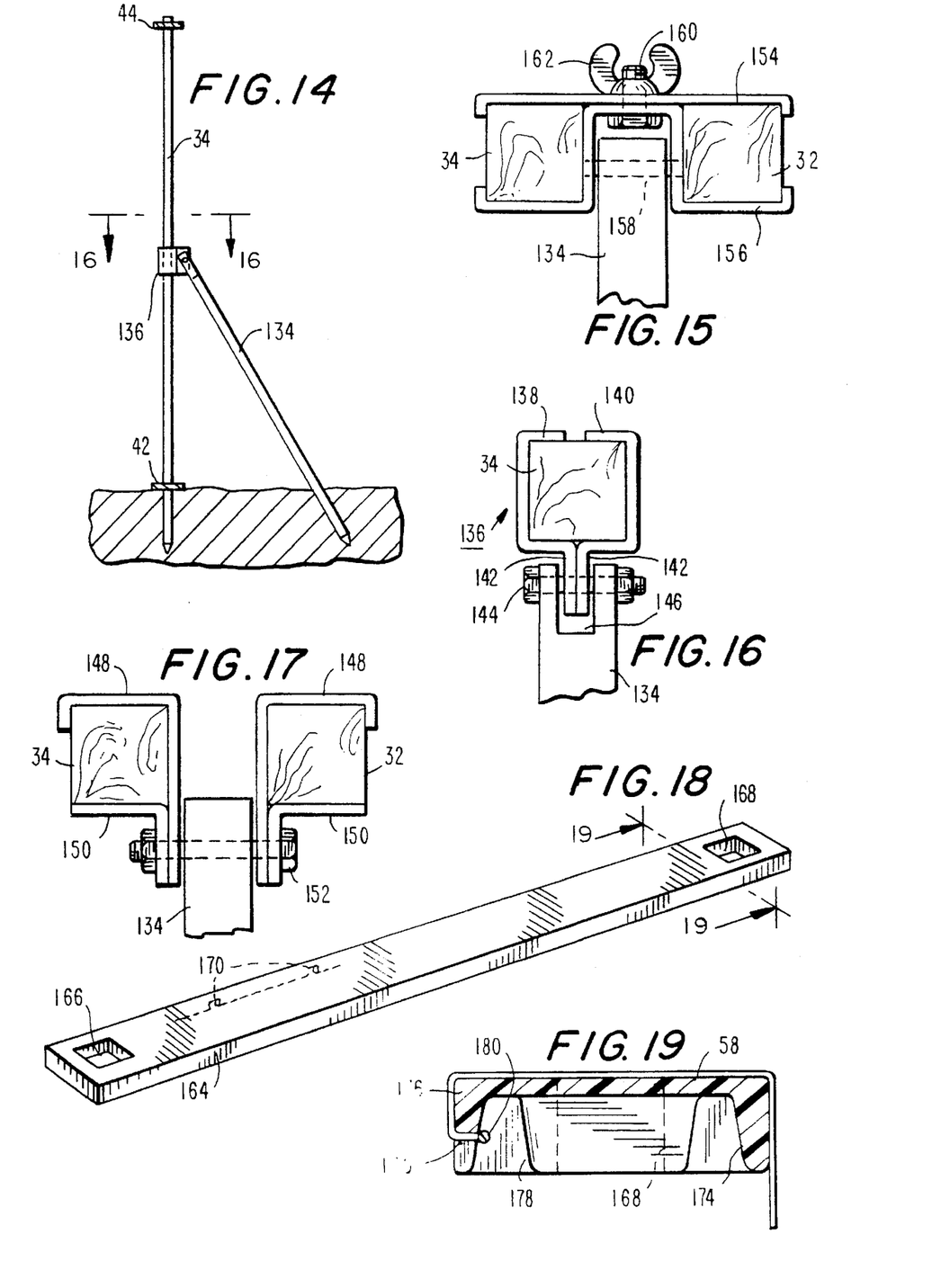
FIG. 14 is a side elevation view, partially schematic, of another embodiment of the invention.
FIG. 15 is a partially schematic and partially cross-sectional view of an attachment detail for the structure shown in FIG. 14.
FIG. 16 is a cross-sectional view taken along line 16—16 of FIG. 14.
FIG. 17 is another embodiment of attachment detail for the structure of FIG. 14.
FIG. 18 is a perspective view of an alternative form of the crossbar of the trellis of the present invention molded out of plastic.
FIG. 19 is a cross-sectional view taken along line 19—19 of FIG. 18.

FIG. 14 shows a prop structure to support the trellis, especially tall trellises, to prevent them from blowing over in heavy winds. A brace 134 is attached to one or more of the poles 34 by means of a bracket 136.

A single-pole bracket 136 is shown in FIG. 16. The bracket consists of a pair of metal members 138 and 140 shaped to partially embrace the pole 34 as shown, with two end portions 142 with a hole through them. The end of the brace 134 has a slot 146 into which the ends 142 fit, and a bolt 144 fastens the end of the brace to the bracket. Tightening of the bolt 144 tightens the grip of the brackets 138 and 140 on the pole.

As it is shown in FIG. 14, the lower end of the pole 134 is driven into the ground. Alternatively, it can be attached to a concrete anchor, or other such means.

When two trellises, such as those shown in FIG. 1, are arranged close to one another side-by-side, the ends of the crossbars overlap as shown. The brackets shown in FIGS. 15 and 17 are designed to fasten a brace 134 to both of the adjacent poles 32 and 34 at the junction between the trellises.

In the embodiment of FIG. 15, a plate 154 and a second U-shaped plate 156 are provided. The end of the brace 134 is pivoted to the bracket 156 by means of a pin 158, and a bolt 160 with a wing nut 162 fastens the brackets 156 and 154 together and holds the poles 32 and 34 tightly together.

The structure shown in FIG. 17 is similar to that in FIG. 15, except that two brackets, each consisting of an angle 150 and a J-shaped bracket 148, are used to grip each pole. A bolt 152 passes through the end of the brace 134 and holes in the brackets 150 to secure the various elements together and hold both poles 32 and 34 firmly against toppling wind forces.

Molded Structures

Although wooden crossbars have been described above, they can be molded advantageously out of strong plastic material. Such a construction is shown in FIGS. 18 and 19.

The molded crossbar has a pair of square holes 166 and 168 which can be closer to the edges of the panel 164 than with wood without breaking, assuming that sufficiently strong plastic materials are used.

Slots 170 are formed in the lower edge 176 of one of the flanges 174 and 176 of the molded construction. A vertical netting strand 58 is shown wrapped around the crossbar with a horizontal strand captured by the hooks formed by the slots 170. The square holes are formed in a projecting area 178 of the material to give vertical dimension to the hole to prevent it from tipping on the pole.

Modular Trellis Construction

Figure 20:
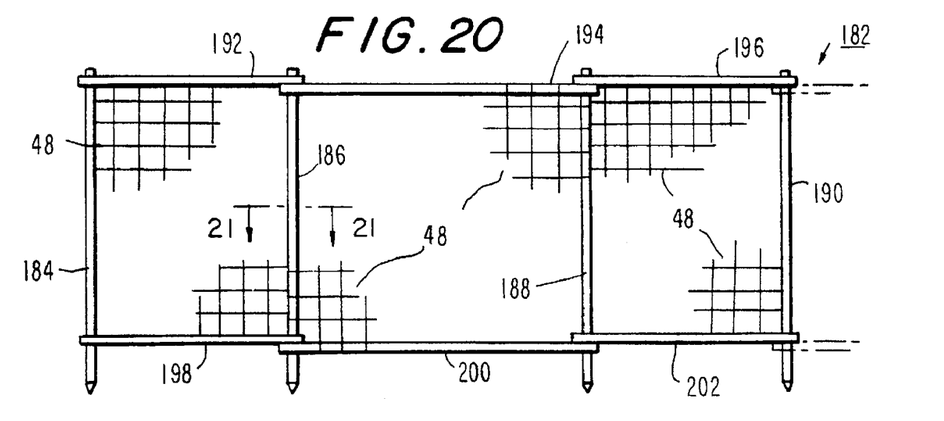
FIG. 20 is a front elevation view of a elongated modular trellis structure constructed in accordance with the present invention.

FIG. 20 shows a trellis construction in which the trellis is made relatively much longer than either of the trellises shown in FIG. 1. It is made by joining several of the trellises together in a unique fashion which reduces the usage of materials from what it would be if trellises were placed end-to-end as shown in FIG. 1.

The structure shown in FIG. 20 includes poles 184, 186, 188 and 190 and top crossbars 192, 194 and 196, as well as bottom crossbars 198, 200 and 202. As it can be seen, each of the poles 186 and 188 is made to serve as the vertical pole at one edge of two separate sections of trellis. Thus, for the three trellis sections shown in FIG. 20, only four poles are used instead of six which would be required if the arrangement of FIG. 1 were used.

As it can be seen, the center section of the three sections can be considerably wider than either of the sections on opposite sides, if desired.

Figure 21:
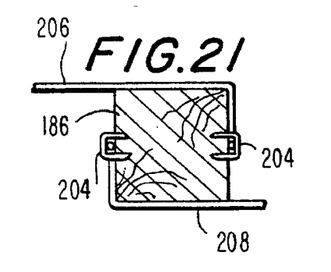
FIG. 21 is an enlarged cross-sectional view taken along line 21—21 of FIG. 20.

Preferably, the side edges of the netting panels are attached to the common pole 186 or 188 as is shown in FIG. 21. Horizontal strands 206 from the left panel are fastened to one side of the pole 186 by means of staples 204, and horizontal strands 208 from the central panel are attached to the opposite side of the pole 186 by staples 204.

When the poles 186 and 188 are rotated, they simultaneously tighten the netting in two different panels. When the tightness of the netting in the central panel has been set, final adjustments can be made by rotating the end poles 184 and 190.

If desired, other sections can be added to the structure 182 shown in FIG. 20.

The structure shown in FIG. 20 has the advantage that all of the sections are integrally attached to one another, as well as requiring fewer poles.

Of course, where two crossbars such as 194 and 196 are stacked one on top of the other on a pole such as 188, the stop member is positioned lower on the pole so as to accommodate both thicknesses of crossbar material.

Extended Trellises

Figure 22:
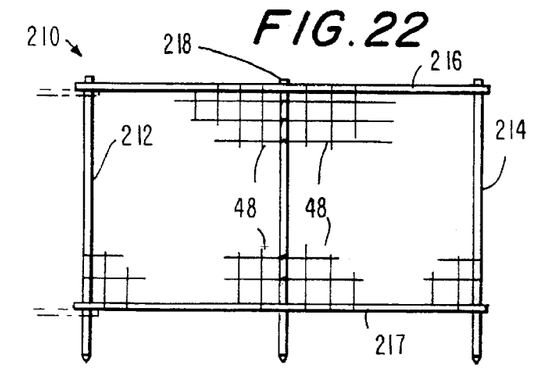
FIG. 22 is a front elevation view of an elongated trellis constructed in accordance with the present invention.

FIG. 22 shows a longer trellis made in a different fashion from that shown in FIG. 20. The construction shown in FIG. 20 most advantageously is used when the netting that is used is available in only relatively narrow panels and the trellis is tall.

If the trellis is relatively short, the netting material can be turned sideways and the resulting trellis can be made much longer without joining sections together as shown in FIG. 20.

The trellis 210 shown in FIG. 22 includes one long top crossbar 216 and one long bottom crossbar 217 and a pair of poles 212 and 214. A third pole 218 is inserted through another square hole in the middle of the crossbars to provide a central support for both the crossbars and the netting.

The netting is supported by hooking its strands over hooks 224 (see FIGS. 23 and 24) formed in a metal strip 220 extending vertically on the pole 218 and nailed in place using nails 222. Preferably, the horizontal strands 62 are hooked over the hooks 224 near their attachment point to a vertical strand 58 so as to provide maximum support for the netting. The strip 220 preferably is of metal in which the hooks 224 have been formed by punching the strip.

Figure 23:
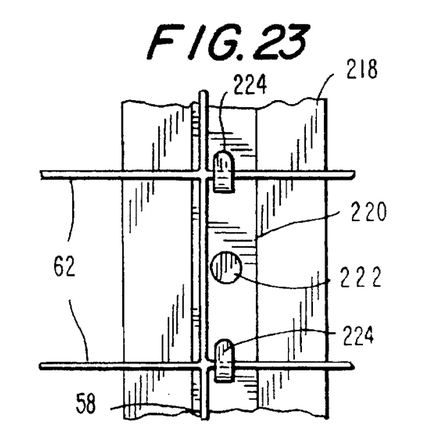
FIG. 23 is an enlarged front elevation view of a portion of the structure of FIG. 22.
Figure 24:
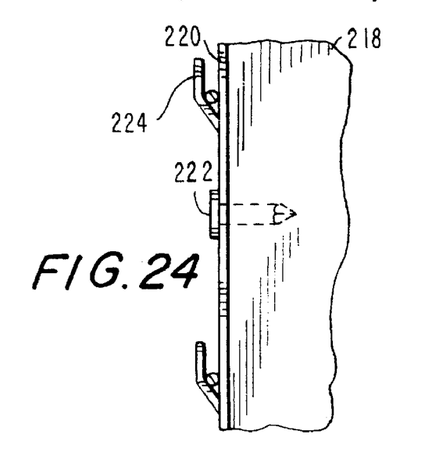
FIG. 24 is a side elevation view of the portion shown in FIG. 23.

It usually will not be necessary to fasten the netting to the center pole 218 because the netting is supported adequately by the top crossbar. However, fastening may help stabilize the lattice.

Materials

Some of the materials of which the trellises can be made have been mentioned above. The poles can be made of ordinary wood, for giving the lowest initial cost.

Rot-resistant woods can be used instead, such as pressure treated wood, redwood and cedar. This will cost more initially, but will give the trellis a considerably longer life and may be more economical in the long run.

Figure 13:
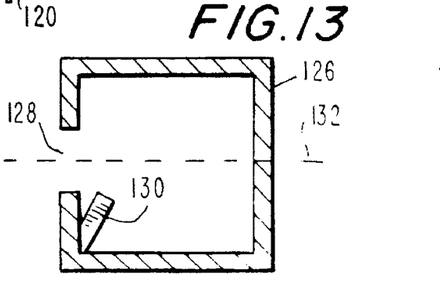
FIG. 13 is a cross-sectional view taken along line 13—13 of FIG. 12.

Plastic-coated or painted steel can be used, either in the form of a slotted tube, as shown in several of the figures of the drawings or as an angle or channel. The channel is indicated in FIG. 13 by the line 132 along which the structure shown there would be cut to form the channel. If a channel or angle structure is used, the shape of the holes in the crossbars would be changed so that the angle or channel could be rotated when out of the holes, but would be held against rotation when inserted into the holes.

Aluminum channels can be used without painting or anodizing or with painting or anodizing, as desired. Aluminum is very resistant to corrosion.

The netting can be made of open-weave nylon netting, for example, with square openings. Such material is integrally woven together at the junction points to form a strong mesh. The material also is relatively stretchable so that adjustability of the tension by the means described above is an even more significant advantage.

If necessary, and especially in areas of the world relatively close to the equator, such as in Florida in the U.S., the nylon netting can be coated with a protective coating sold by various companies which blocks most of the ultraviolet radiation. This reduces or prevents deterioration of the nylon due to ultraviolet exposure.

Other nettings, such as extruded or expanded netting made out of black polyethylene, is ultraviolet light-resistant and may be preferred to the nylon netting.

Other flexible netting materials can be used with varying advantages.

Metal parts, such as the hook strips 118 (FIG. 10) and 220 (FIG. 23) can be made of plastic or zinc-plated or cadmium-plated plated steel. Galvanized metal is an alternative for all metal posts and parts.

The above description of the invention is intended to be illustrative and not limiting. Various changes or modifications in the embodiments described may occur to those skilled in the art. These can be made without departing from the spirit or scope of the invention.

I claim:

1. A trellis kit comprising, in combination, a pair of poles, at least one crossbar having openings of polygonal shape for receiving said poles, each of said poles having at least a portion with a cross-sectional shape matching that of said openings with dimensions smaller than those of said openings so that said crossbar forms a slip fit onto said poles to join said poles together in spaced apart relationship to form a frame, and a lattice made of flexible netting and shaped to span the space between said poles when attached to said poles, whereby said crossbar can be slipped onto said poles in forming a trellis, and can be slipped off of said poles to disassemble said trellis, and said openings will hold each of said poles in a selected one of a plurality of different rotational positions so as to permit adjustment of the tension of said netting when attached between said poles.

2. A kit as in claim 1 in which said lattice is fastened at its edges between said poles and can be rolled up on one of said poles when said trellis is not in use so as to minimize the size of said kit.

3. A kit as in claim 1 including an attachment device for attaching said netting to said poles, said attachment device being selected from the group consisting of drivable fasteners and hooks.

4. A kit as in claim 1 in which said netting is dimensioned to be wider than the space between said poles when assembled with said crossbar, and fastening means for fastening said netting to said poles so as to compel said netting to be wrapped at least part way around said poles to pull it taut.

5. A kit as in claim 1 in which said poles are selected from the group consisting of wooden members and hollow tubing, and each pole bears an elongated array of hooks formed by spaced notches in a protruding edge.

6. A kit as in claim 1 in which said crossbar has a plurality of pairs of pole-receiving holes to enable forming a trellis of variable width.

7. A kit as in claim 1 including at least one additional pole for forming a trellis of substantial width.

8. A kit as in claim 1 including two of said crossbars, each of said crossbars comprising a generally planar member having a pair of rectilinear holes, each of said poles having a rectilinear cross-section with dimensions smaller than those of said holes, whereby said crossbars can slide freely on said poles, but said poles cannot rotate freely when inserted into said holes, a stop member on each of said poles adjacent but spaced from one end of said pole, attachment means for attaching said netting to said poles at opposite sides of said netting, a plurality of hooks formed by transverse slots at spaced intervals along one edge of each of said crossbars, said netting being wider than the spacing between said poles.

9. A trellis kit comprising, in combination, a pair of poles, at least one crossbar adapted to form a slip fit onto said poles to join said poles together in spaced apart relationship to form a frame, and a lattice made of flexible netting and shaped to span the space between said poles when attached to said poles, whereby said at least one crossbar can be slipped onto said poles in forming a trellis, and can be slipped off of said poles to disassemble said trellis, in which each of said poles has a stop member adjacent one end to hold said at least one crossbar in a predetermined position after being slipped onto said poles, and said at least one crossbar has an attachment device for attaching said netting to said at least one crossbar adjacent one edge of said netting, whereby said at least one crossbar serves as a top crossbar holding said netting up while spacing said poles apart, and said kit including a second crossbar adapted to form a slip fit onto said poles to join said poles together at a longitudinal position spaced from the position of said at least one crossbar, said second crossbar having an attachment device for securing said netting to said second crossbar adjacent one edge of said netting and in which said second crossbar is freely slidable on said poles when said netting is attached to said second crossbar.

10. A kit as in claim 9 in which each of said crossbars is a planar member with a front edge adjacent the plane of said lattice and a rear edge spaced from said plane, and including hooks for attaching said netting, said hooks being formed by slots cut in one of said edges at spaced intervals.

11. A kit as in claim 10 in which said slots are formed in said rear edge to compel said netting to be wrapped part-way around said crossbar to engage with said hooks.

12. A trellis kit comprising, in combination, a pair of poles, at least one crossbar adapted to form a slip fit onto said poles to join said poles together in spaced apart relationship to form a frame, and a lattice made of flexible netting and shaped to span the space between said poles when attached to said poles, whereby said crossbar can be slipped onto said poles in forming a trellis, and can be slipped off of said poles to disassemble said trellis, in which each of said poles has a stop member adjacent one end to hold said crossbar in a predetermined position after being slipped onto said poles, and said crossbar has an attachment device for attaching said netting to it adjacent one edge of said netting, whereby said crossbar serves as a top crossbar holding said netting up while spacing said poles apart, in which said attachment device comprises hooks spaced over the portion of the crossbar to which said netting is to be attached, said hooks being positioned to force said netting to be bent around at least a portion of said crossbar when said netting is attached.

13. A trellis comprising a pair of poles, at least one crossbar with a plurality of openings, said poles being slidably mounted in said openings, a lattice made of flexible netting secured to said poles at locations adjacent first and second opposing edges of said netting, said openings and poles being shaped so that said poles are held against rotation in said openings but can be rotated when removed from said openings to roll up or unroll said netting on said poles to adjust the tension on and/or width of said netting, including a second crossbar slidably mounted on said poles at a location spaced from the location of said at least one crossbar, said at least one and second crossbars having attachment means to secure third and fourth opposing edges of said netting thereto, said attachment means comprising a plurality of hooks positioned to engage strands of said netting and to bend said netting over at least one edge of each said crossbar.

14. A trellis comprising a pair of poles, at least one crossbar with a plurality of openings, said poles being slidably mounted in said openings, a lattice made of flexible netting secured to said poles at locations adjacent first and second opposing edges of said netting, said openings and poles being shaped so that said poles are held against rotation in said openings but can Be rotated when removed from said openings to roll up or unroll said netting on said poles to adjust the tension on and/or width of said netting, in which said poles are one of the group consisting of wooden poles with the netting secured thereto by drivable fastenings; wooden poles with elongated strips forming hooks; and metal members with longitudinal slots and notched offset edges forming hooks.

15. A trellis, said trellis comprising, in combination, a pair of poles, a first crossbar attached to and spanning the distance between said poles, a plurality of projections distributed along said first crossbar, a lattice made of mesh material and having a top edge and a bottom edge, said projections engaging said mesh material adjacent said top edge, a second crossbar spanning the distance between said poles at a location spaced from said first crossbar, said mesh material being fastened to said second crossbar adjacent said bottom edge of said mesh material, in which each of said projections is formed by a pair of slots in one surface of said first crossbar, said mesh material having vertical strands fitted into said slots.

16. A trellis as in claim 15, including a plurality of projections distributed along the length of said second crossbar and penetrating said mesh material to relasably fasten said second crossbar and said mesh material together.

17. A trellis as in claim 15, in which said second crossbar is mounted to slide up and down on said poles to adjust the tension in said mesh material.

18. A trellis, said trellis comprising, in combination, a pair of poles, a first crossbar attached to and spanning the distance between said poles, a plurality of projections distributed along said first crossbar, a lattice made of mesh material and having a top edge and a bottom edge, said projections engaging said mesh material adjacent said top edge, a second crossbar spanning the distance between said poles at a location spaced from said first crossbar, said mesh material being fastened to said second crossbar adjacent said bottom edge of said mesh material, in which each of said projections is formed by a pair of slots in one surface of said first crossbar, said mesh material having vertical strands fitted into said slots in which said trellis has front and rear surfaces, said lattice being positioned on said front surface, and in which said mesh material is hooked over said projections and is wrapped at least part-way around said first crossbar.

19. A trellis comprising a pair of combinations, each of said combinations having a pole member and crossbar member, one of said crossbar member and said pole member having a polygonal shaped hole, and the other of said crossbar member and said pole member having a polygonal cross-sectional shape and size to allow said other one of said members to be inserted into said hole and to be held without rotation in said hole, said pole member and crossbar member combinations being assembled together with said crossbar members extending between said poles at spaced-apart locations, and a lattice of mesh material secured between said crossbar members.

* * * * *